United States Patent
Yang et al.

(10) Patent No.: US 10,177,356 B1
(45) Date of Patent: Jan. 8, 2019

(54) AUTOMOTIVE BATTERY MOUNTING STRUCTURE

(71) Applicants: Hyundai Motor Company, Seoul (KR); Kia Motors Corporation, Seoul (KR)

(72) Inventors: Seng Joo Yang, Hwaseong-si (KR); Do Geun Jung, Suwon-si (KR); Hee Gun Yang, Anyang-si (KR); Ji Woong Park, Hwaseong-si (KR); Seog Won Choi, Suwon-si (KR); Seung Won Kim, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/787,477

(22) Filed: Oct. 18, 2017

(30) Foreign Application Priority Data

Jun. 16, 2017 (KR) .................... 10-2017-0076656

(51) Int. Cl.
*B60K 1/04* (2006.01)
*H01M 2/10* (2006.01)
*B60R 16/04* (2006.01)

(52) U.S. Cl.
CPC ........... *H01M 2/1083* (2013.01); *B60R 16/04* (2013.01); *H01M 2220/20* (2013.01)

(58) Field of Classification Search
CPC .............. B60K 1/04; B60K 2001/0411; B60K 2001/0416; B60K 2001/0422; B60K 2001/043; B60K 2001/0428; B60K 2001/0405
See application file for complete search history.

(56) References Cited

U.S. PATENT DOCUMENTS

2013/0319785 A1* 12/2013 Spindler .............. B62D 23/005
180/292

FOREIGN PATENT DOCUMENTS

| KR | 10-1999-0052099 A | 7/1999 |
|----|-------------------|--------|
| KR | 10-0452245 B1 | 10/2004 |
| KR | 10-0527991 B1 | 11/2005 |
| KR | 10-0612195 B1 | 8/2006 |
| KR | 10-0828812 B1 | 5/2008 |

* cited by examiner

*Primary Examiner* — Bryan A Evans
(74) *Attorney, Agent, or Firm* — Morgan, Lewis & Bockius LLP

(57) ABSTRACT

An automotive battery mounting structure may include a battery tray connected to one of a pair of front side members disposed on a lower side of an engine compartment, and a battery secured to the battery tray. A transmission mount and a leg bracket may be coupled to the front side member, and the battery tray may be coupled to the transmission mount and the leg bracket by a plurality of fasteners.

17 Claims, 18 Drawing Sheets

AUTOMOTIVE BATTERY MOUNTING STRUCTURE

CROSS-REFERENCE TO RELATED APPLICATION

The present application claims priority to Korean Patent Application No. 10-2017-0076656, filed on Jun. 16, 2017, the entire contents of which is incorporated herein for all purposes by this reference.

BACKGROUND OF THE INVENTION

Field of the Invention

The present invention relates to an automotive battery mounting structure that enables an automotive battery to be stably mounted, meeting the requirements of crash-regulations and improving crashworthiness.

Description of Related Art

A vehicle needs an electrical energy supply that may supply electrical energy to start an engine or to operate auxiliary components and devices. While the engine of the vehicle is running, an alternator operated by the engine supplies electrical energy, whereas while the engine is not running, an automotive battery supplies electrical energy.

The automotive battery is mounted in an engine compartment to meet the requirements of crash-regulations in China, Europe, and the like.

In the related art, an automotive battery is secured to a battery tray, and the battery tray is mounted on a plurality of leg brackets to be connected to a side member through the leg brackets. The plurality of leg brackets are mounted on the side member in a cantilever manner to prevent interference with neighboring components including a transmission mount. Due to this, longitudinal edge portions of the battery tray may be disposed along the lateral direction of a vehicle.

However, in the case of a collision of the vehicle, the leg brackets may easily collapse so that the automotive battery may directly hit a booster while moving to a lower side of the vehicle. At the present time, the booster may be pushed toward the internal of the vehicle to move pedals toward the internal, and the pedals may cause an injury to a lower limb of a driver or passenger.

Furthermore, the automotive battery in the related art may not be stably secured to the battery tray and thus may be easily damaged or separated from the battery tray in the case of a collision of the vehicle. Thus, the automotive battery in the related art may not meet the requirements of crash-regulations in China, Europe, and the like.

The information disclosed in the present Background of the Invention section is only for enhancement of understanding of the general background of the invention and may not be taken as an acknowledgement or any form of suggestion that the present information forms the prior art already known to a person skilled in the art.

BRIEF SUMMARY

Various aspects of the present invention are directed to providing an automotive battery mounting structure that enables an automotive battery to be stably mounted on a side member of a vehicle, meeting the requirements of crash-regulations and improving crashworthiness.

The technical problems to be solved by the present invention are not limited to the aforementioned problems, and any other technical problems not mentioned herein will be clearly understood from the following description by those skilled in the art to which the present invention pertains.

According to various aspects of the present invention, an automotive battery mounting structure may include a battery tray connected to one of a pair of front side members disposed on a lower side of an engine compartment, and a battery secured to the battery tray. A transmission mount and a leg bracket may be coupled to the front side member. The battery tray may be coupled to the transmission mount and the leg bracket by a plurality of fasteners.

At least a portion adjacent to a front edge portion of the battery tray may be coupled to the transmission mount and the leg bracket.

The leg bracket may extend in a direction perpendicular to an axial direction of the front side member.

The battery tray may have a first fastening hole formed in a portion adjacent to a front edge portion of the battery tray, a second fastening hole formed in a portion adjacent to a left edge portion and the front edge portion of the battery tray, and a third fastening hole adjacent to a rear edge portion of the battery tray.

The first fastening hole may be secured to the leg bracket by a fastener, and the second and third fastening holes may be secured to the transmission mount.

A longitudinal face of the battery and a longitudinal edge portion of the battery tray may be disposed along a longitudinal direction of a vehicle.

The battery may have a plurality of legs, and at least one of the plurality of legs may be secured to the battery tray by a fixing bracket.

The battery tray may have a plurality of restriction ribs that restrict at least some of the plurality of legs.

Each leg may have a sloping portion obliquely extending from a lower portion of the battery and a vertical portion vertically extending from the sloping portion.

At least one of the plurality of restriction ribs may have an inclined face corresponding to the sloping portion of the leg and a vertical face corresponding to the vertical portion of the leg.

At least one of the plurality of restriction ribs may have a vertical face corresponding to the vertical portion of the leg.

The battery tray may further include a mounting shelf on which an engine controller is mounted, and the mounting shelf may have a base that supports a bottom face of the engine controller.

The base of the mounting shelf may be located at a lower position than a support face of the battery tray.

The mounting shelf may be integrally formed at a right edge portion of the battery tray.

The engine controller may have a cover plate coupled to one face of the engine controller, and the cover plate may have a front extension extending from a front edge portion of the cover plate, a rear extension extending from a rear edge portion of the cover plate, and an opening formed in a center portion of the cover plate.

The mounting shelf may have the plurality of posts supporting the cover plate of the engine controller.

The front extension may extend in a direction perpendicular to a longitudinal edge portion of the battery tray, and the rear extension may extend in a direction parallel to the longitudinal edge portion of the battery tray.

A plurality of posts may include a front post supporting the front extension of the cover plate, a rear post supporting the rear extension of the cover plate, and an intermediate post supporting the opening of the cover plate.

The front post may have an opening to which the front extension of the cover plate is coupled, and the opening of the front post may be defined by a plurality of support faces. The plurality of support faces may include a first support face supporting a front face of the front extension, a second support face supporting a rear face of the front extension, a third support face supporting a right face of the front extension, and a fourth support face supporting a left face of the front extension.

The rear post may have an opening to which the rear extension of the cover plate is coupled, and the opening of the rear post may be defined by a plurality of support faces. The plurality of support faces may include a first support face supporting a right face of the rear extension, a second support face supporting a left face of the rear extension, and a third support face supporting a rear face of the rear extension.

According to an exemplary embodiment of the present invention, it is possible to: allow the center of gravity of the battery to be located close to the side member; stably maintain the battery; reduce the weight and material cost; improve crashworthiness; and prevent the battery from being separated from the battery tray in the case of a collision of the vehicle.

According to an exemplary embodiment of the present invention, the longitudinal faces of the battery and the longitudinal edge portions of the battery tray may be disposed in the longitudinal direction of the vehicle, and thus the crashworthiness of the vehicle may be significantly improved.

According to an exemplary embodiment of the present invention, since the first fastening hole and the second fastening hole, which are adjacent to the front edge portion of the battery tray, are secured to the leg bracket and the transmission mount, respectively, the battery and the battery tray may pivot upward about the front edge portion of the battery tray in the case of a collision of the vehicle. Accordingly, the battery may first collide with a cowl of the vehicle body without directly hitting a booster so that the amount of collision energy transferred to the booster may be reduced. As a result, it is possible to minimize a movement of pedals toward the internal of the vehicle, reducing an injury to a lower limb of a driver or passenger.

Furthermore, a battery tray in the related art is secured to two leg brackets, whereas the battery tray according to an exemplary embodiment of the present invention may be secured to one leg bracket and the transmission mount so that it is possible to reduce the weight and material cost.

According to an exemplary embodiment of the present invention, the first leg of the battery may be secured by the fixing bracket, the second leg and the third leg of the battery may be restricted by the rear restriction rib and the left restriction rib in the vertical direction and the lateral direction of the vehicle, and the fourth leg of the battery may be restricted by the right restriction rib in the lateral direction of the vehicle. As a result, the battery may be securely secured to the battery tray. Therefore, the battery may move together with the battery tray without separation from the battery tray even under severe test conditions including oblique impact, rear impact, and the like, and may thus meet the requirements of battery separation prevention regulations.

According to an exemplary embodiment of the present invention, the second to fourth legs of the battery may be restricted by the restriction ribs of the battery tray so that it is not necessary to implement a structure in which the fixing bracket surrounds the battery. As a result, the size of the fixing bracket may be remarkably decreased, and the structure of the fixing bracket may be simplified. The decrease in the size of the fixing bracket and the simple structure thereof may contribute to a reduction in the weight or manufacturing cost of the bracket.

According to an exemplary embodiment of the present invention, since the engine controller is disposed on a lower side of the engine compartment, a gap between the engine controller and a hood that opens or closes the top portion of the engine compartment may be stably ensured, satisfying a protection space for a pedestrian.

According to an exemplary embodiment of the present invention, since the front extension of the cover plate is supported by the front post in the four directions and the rear extension of the cover plate is supported by the rear post in the three directions, the engine controller may be securely coupled to the mounting shelf, and high-speed crashworthiness may be remarkably improved.

According to an exemplary embodiment of the present invention, since the engine controller is fitted into the mounting shelf by the front post, the rear post, and the intermediate post of the mounting shelf, a separate fastener is not needed, and thus it is possible to decrease the number of assembly steps, as well as to remarkably reduce the weight and material cost. This may help to increase economic effects, in addition to improving the crashworthiness of the vehicle.

According to an exemplary embodiment of the present invention, the battery tray may be secured to the left front side member. As a result, it is possible to reduce the weight on the left side of the engine compartment, balancing the weight of the vehicle and thus solving a problem of leaning to a side during braking and remarkably improving driving stability.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
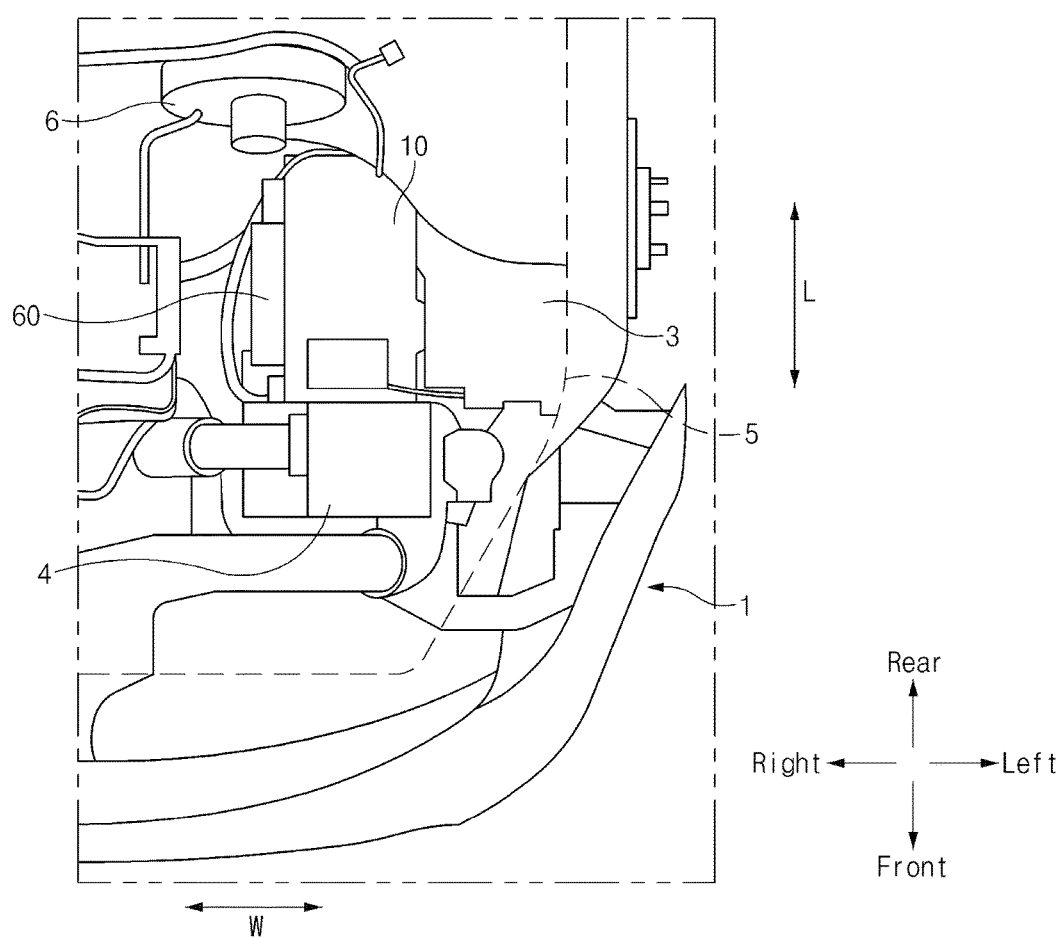
FIG. 1 is a plan view illustrating a state in which a battery mounting structure according to an exemplary embodiment of the present invention is disposed in an engine compartment.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in portion by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Terms including "first", "second", "A", "B", "(a)", "(b)", and the like, may be used herein to describe elements of the present invention. Such terms are only used to distinguish one element from another element, and the substance, sequence, order, or number of these elements is not limited by these terms. Unless otherwise defined, all terms used herein, including technical and scientific terms, have the same meaning as those generally understood by those skilled in the art to which the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, the present invention may include a battery 10 mounted in an engine compartment 5 of a vehicle 1.

The engine compartment 5 may be located on a front side of the vehicle 1 and may have a junction box 3, an air cleaner 4, a transmission, an engine, and the like disposed therein. The battery 10 may be disposed adjacent to the junction box 3 and the air cleaner 4. A front floor and a pair of front side members may be located on a lower side of the engine compartment 5.

Figure 2:
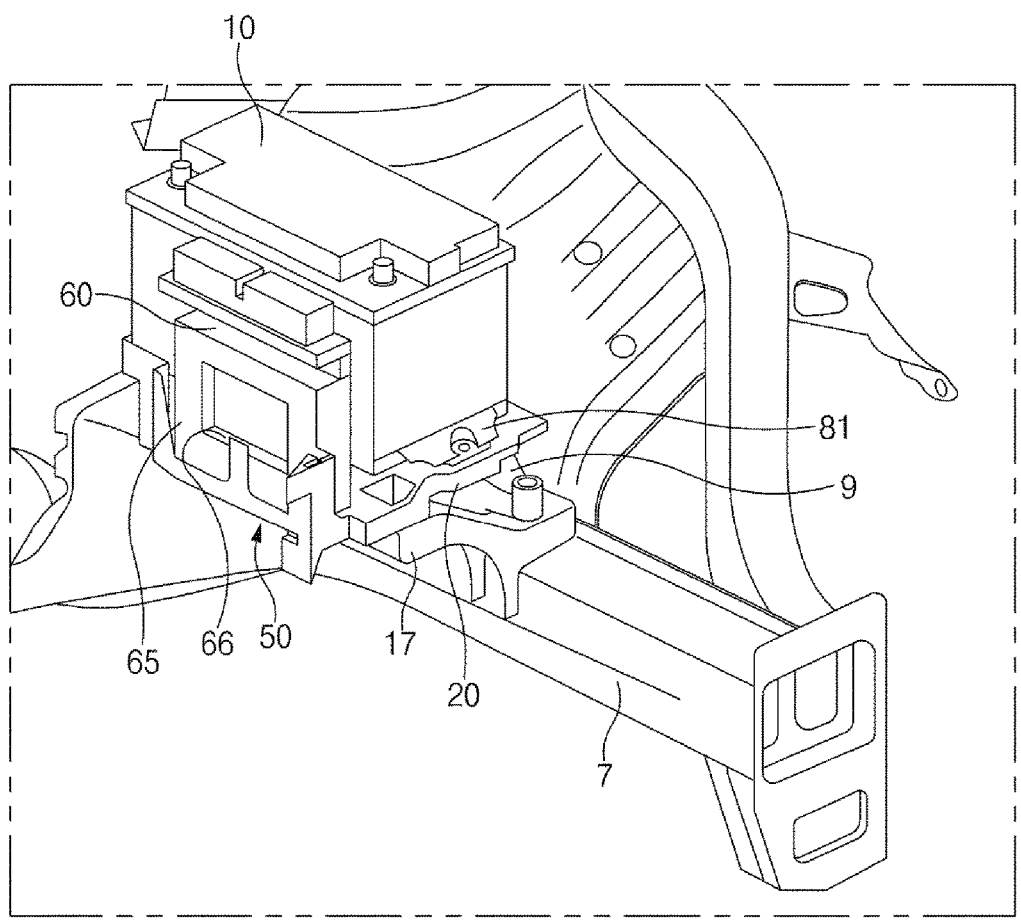
FIG. 2 is a perspective view of the battery mounting structure, according to an exemplary embodiment of the present invention.
Figure 3:
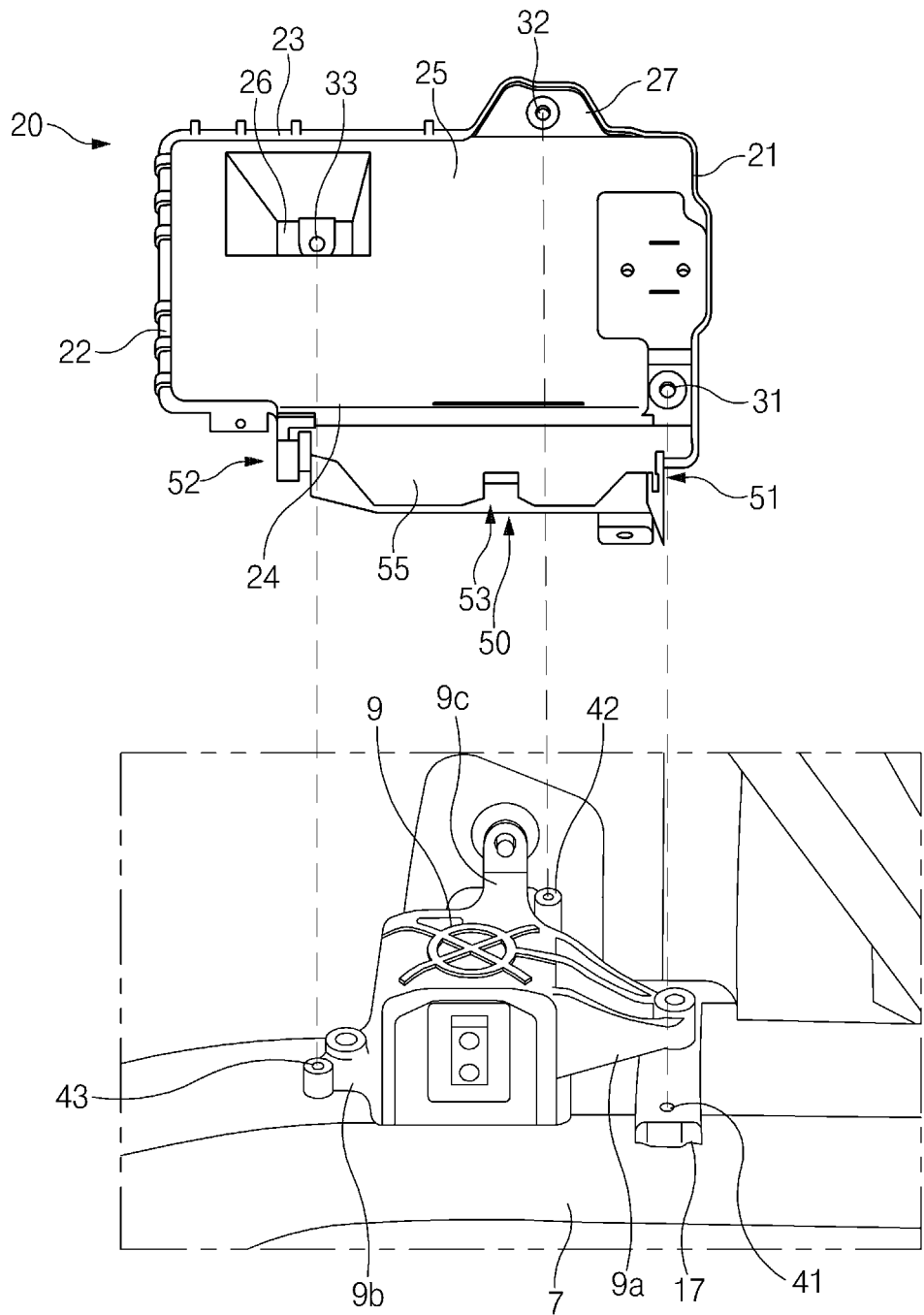
FIG. 3 illustrates a coupling relationship between a battery tray of the battery mounting structure, according to an exemplary embodiment of the present invention, and a transmission mount.
Figure 4:
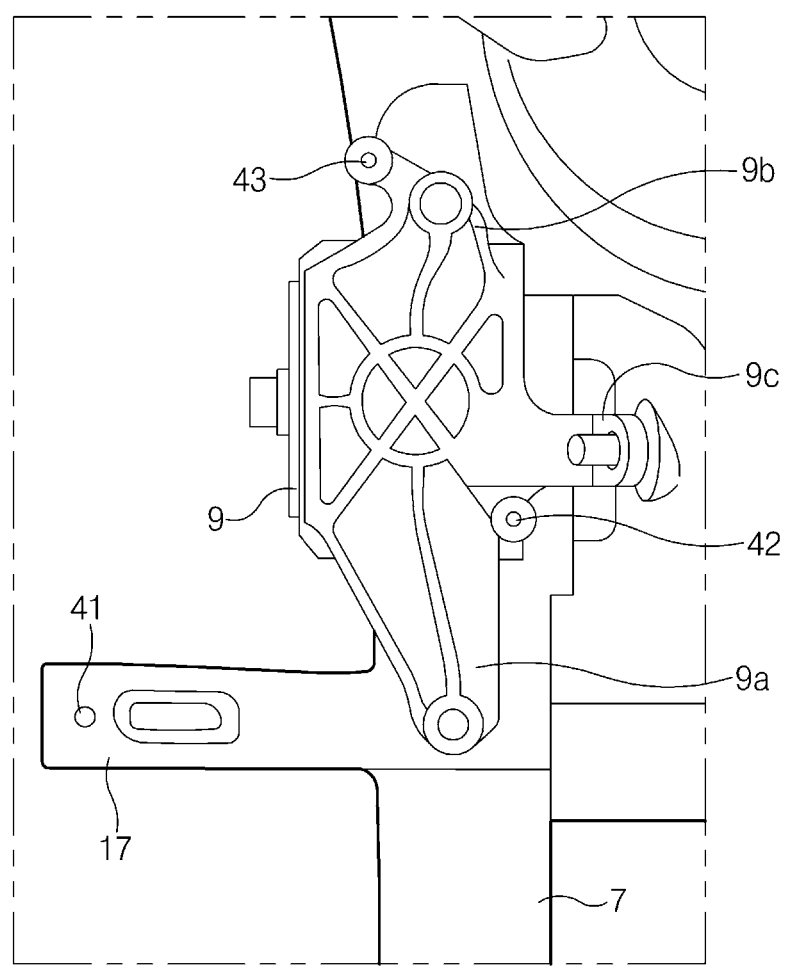
FIG. 4 is a plan view illustrating a structure in which the transmission mount of FIG. 3 is coupled to a side member.

As illustrated in FIG. 2, FIG. 3 and FIG. 4, a battery tray 20 may be secured to one front side member 7 of the pair of front side members, and the battery 10 may be securely mounted on the battery tray 20 so as not to move in the lateral direction (the direction W in FIG. 1) and the longitudinal direction (the direction L in FIG. 1) of the vehicle 1.

According to an exemplary embodiment of the present invention, the battery tray 20 may be secured to the left front side member 7.

As illustrated in FIG. 2, FIG. 3 and FIG. 4, a transmission mount 9 may be mounted on the front side member 7, and a leg bracket 17 may be coupled to the front side member 7 by welding. The leg bracket 17 may extend in a direction perpendicular to the axial direction of the front side member 7. The transmission mount 9 and the leg bracket 17 may be disposed adjacent to each other.

Figure 5:
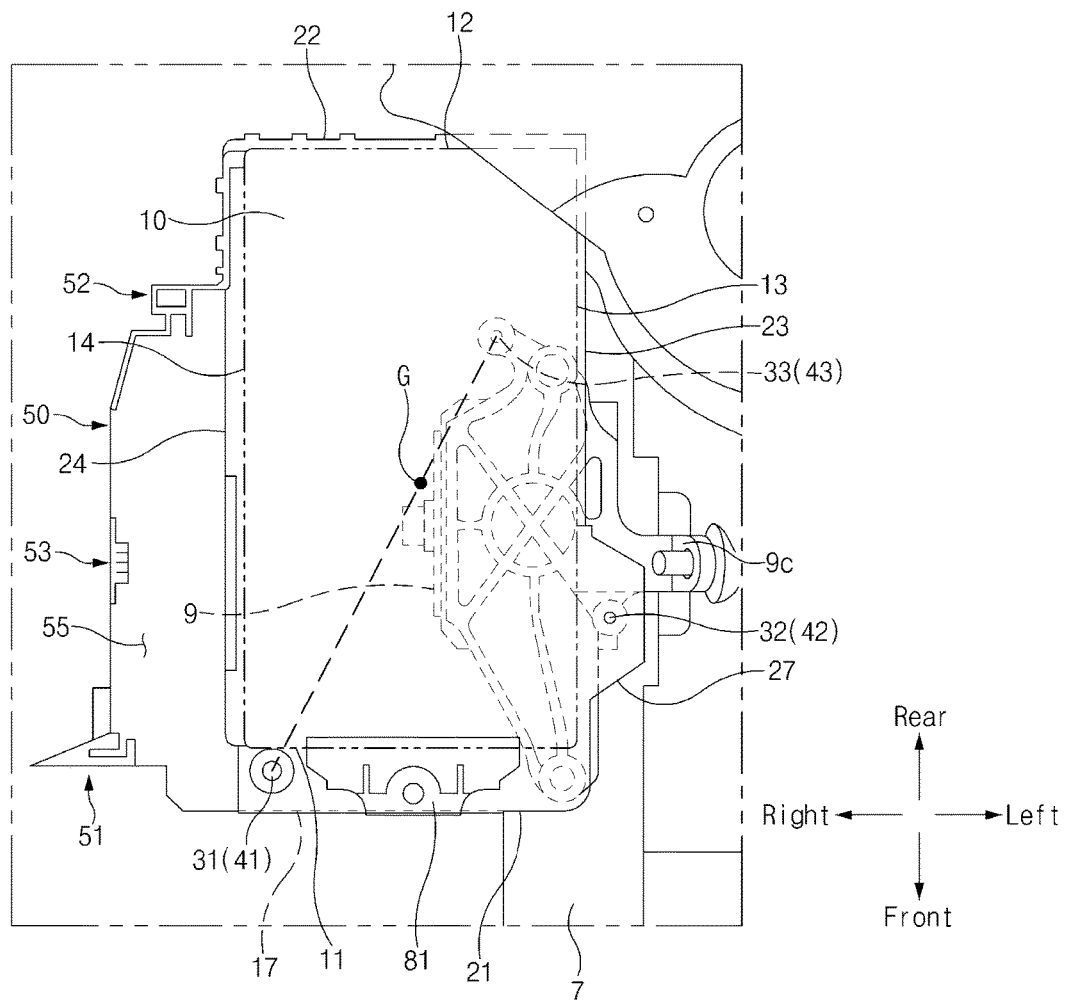
FIG. 5 is a plan view illustrating a state in which the battery tray of the battery mounting structure, according to an exemplary embodiment of the present invention, is mounted on the transmission mount and a leg bracket of the side member.
Figure 6:
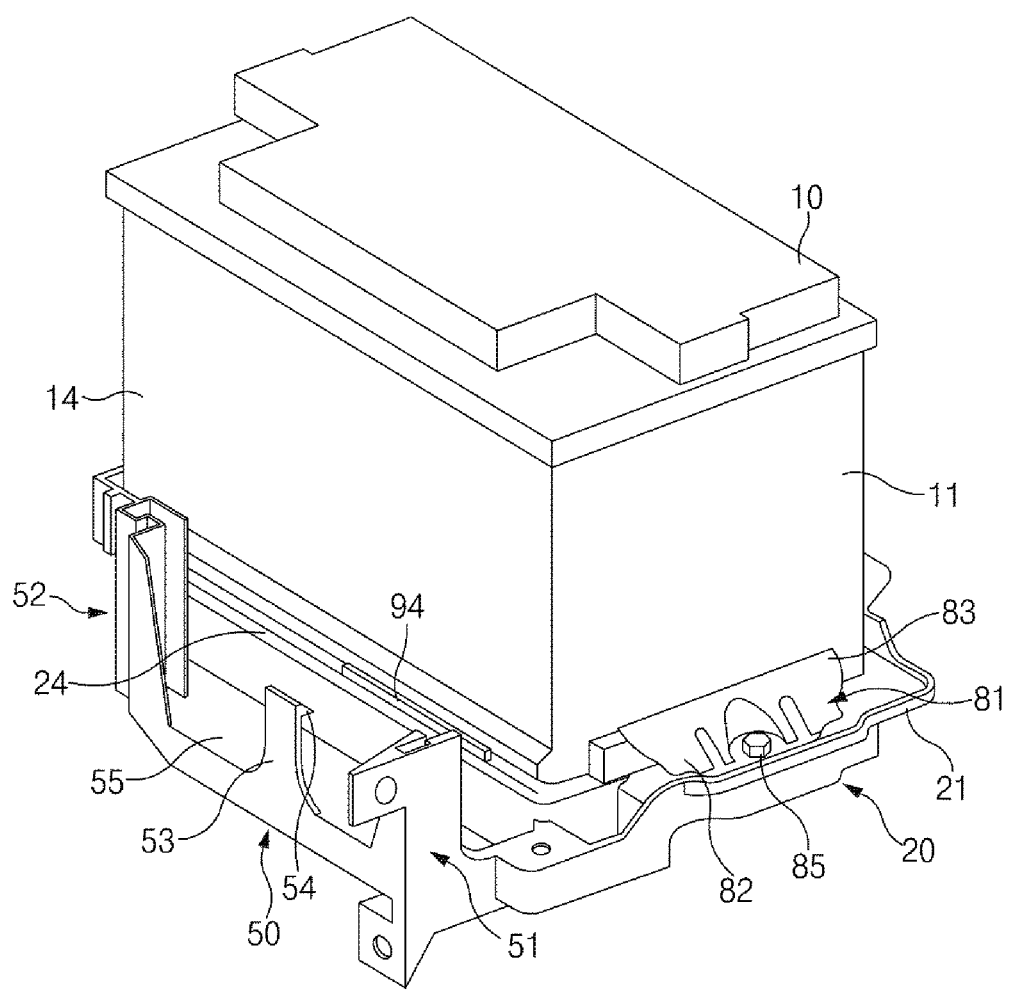
FIG. 6 is a perspective view illustrating a state in which a battery is mounted on the battery tray in the battery mounting structure, according to an exemplary embodiment of the present invention.
Figure 7:
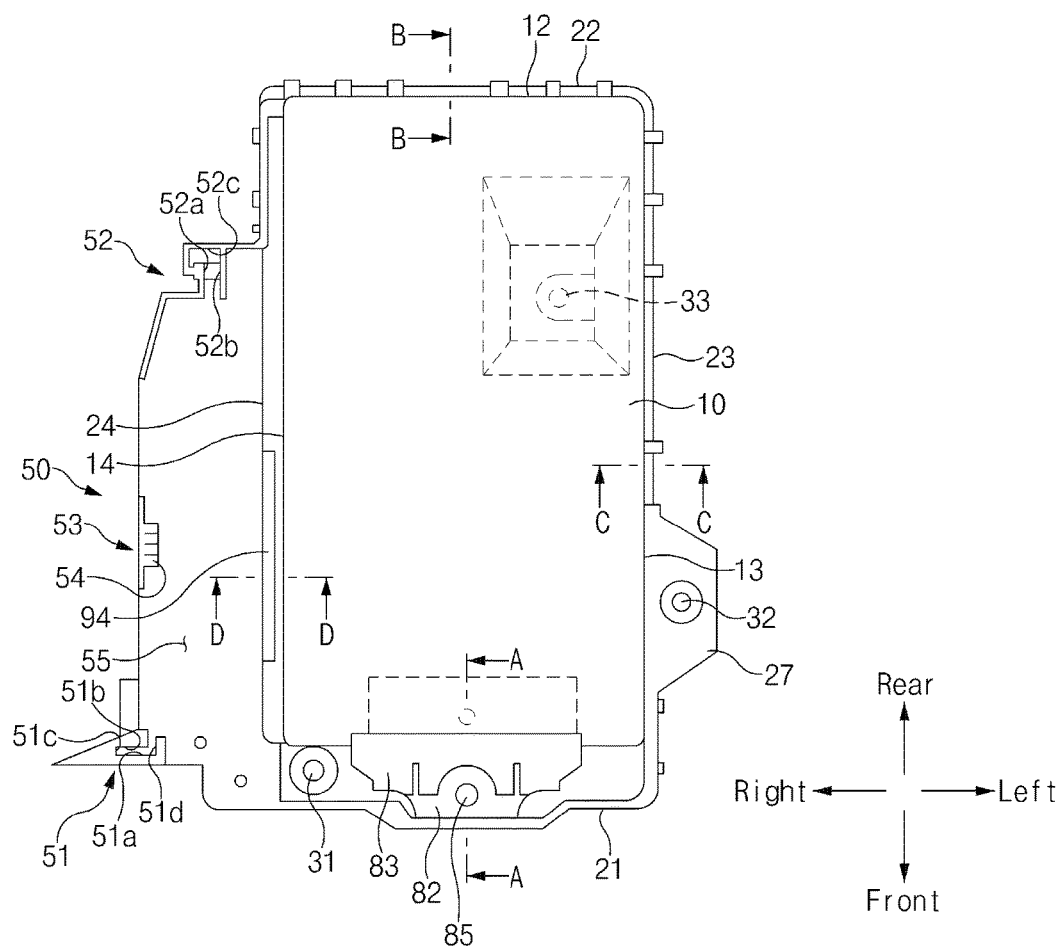
FIG. 7 is a plan view illustrating the state in which the battery is mounted on the battery tray in the battery mounting structure, according to an exemplary embodiment of the present invention.

As illustrated in FIG. 5, the battery 10 may have a pair of lateral faces 11 and 12 parallel to each other and a pair of longitudinal faces 13 and 14 parallel to each other, and the longitudinal faces 13 and 14 may be formed to be longer than the lateral faces 11 and 12.

The longitudinal faces 13 and 14 of the battery 10 may be disposed parallel to the longitudinal direction of the vehicle 1. Since the longitudinal faces 13 and 14 of the battery 10 are disposed along the longitudinal direction of the vehicle 1 as described above, the lateral faces 11 and 12 of the battery 10 may be the front face 11 directing toward the front side of the vehicle 1 and the rear face 12 directing toward the rear side of the vehicle 1, and the longitudinal faces 13 and 14 of the battery 10 may be the left face 13 directing toward the left side of the vehicle 1 and the right face 14 directing toward the right side of the vehicle 1.

The battery tray 20 may have a pair of lateral edge portions 21 and 22 corresponding to the lateral faces 11 and 12 of the battery 10 and a pair of longitudinal edge portions 23 and 24 corresponding to the longitudinal faces 13 and 14 of the battery 10. The pair of lateral edge portions 21 and 22 may be parallel to each other, and the pair of longitudinal edge portions 23 and 24 may be parallel to each other. The longitudinal edge portions 23 and 24 may be formed to be longer than the lateral edge portions 21 and 22.

The longitudinal edge portions 23 and 24 of the battery tray 20 may be disposed parallel to the longitudinal direction of the vehicle 1. Since the longitudinal edge portions 23 and 24 of the battery tray 20 are disposed along the longitudinal direction of the vehicle 1 as described above, the lateral edge portions 21 and 22 of the battery tray 20 may be the front edge portion 21 directing toward the front side of the vehicle 1 and the rear edge portion 22 directing toward the rear side of the vehicle 1, and the longitudinal edge portions 23 and 24 of the battery tray 20 may be the left edge portion 23 directing toward the left side of the vehicle 1 and the right edge portion 24 directing toward the right side of the vehicle 1.

As described above, the longitudinal faces 13 and 14 of the battery 10 and the longitudinal edge portions 23 and 24 of the battery tray 20 may be disposed in the longitudinal direction of the vehicle 1, and thus the crashworthiness of the vehicle 1 may be significantly improved.

The battery tray 20 may have a support face 25 on which the bottom face of the battery 10 is supported. The support face 25 may have at least one depression 26 formed therein, and the battery tray 20 may have a lug 27 integrally formed with one edge portion thereof.

According to various aspects of the present invention, as illustrated in FIGS. 3 and 5, the lug 27 may be formed adjacent to the left edge portion 23 and the front edge portion 21 of the battery tray 20. The depression 26 may be located close to the rear edge portion 22 of the battery tray 20.

Referring to FIG. 3 and FIG. 4, the transmission mount 9 may have a plurality of mounting lugs 9a, 9b, and 9c and may be secured to the front side member 7 by fastening fasteners to the mounting lugs 9a, 9b, and 9c. The transmission mount 9 may connect at least a portion of a transmission 8 to the front side member 7.

As illustrated in FIGS. 2, 3, and 5, the battery tray 20 may be secured to the leg bracket 17 and the transmission mount 9 by a plurality of fasteners. As illustrated in FIGS. 3 and 5, the battery tray 20 may have a first fastening hole 31 formed adjacent to the front edge portion 21 thereof, a second fastening hole 32 formed in the lug 27, and a third fastening hole 33 formed in the depression 26.

According to various aspects of the present invention, since the lug 27 is formed adjacent to the left edge portion 23 and the front edge portion 21 of the battery tray 20 as illustrated in FIGS. 3 and 5, the second fastening hole 32 may be adjacent to the left edge portion 23 and the front edge portion 21 of the battery tray 20. Furthermore, since the depression 26 is located close to the rear edge portion 22 of the battery tray 20, the third fastening hole 33 may be adjacent to the rear edge portion 22 of the battery tray 20.

The first fastening hole 31 may be distanced from the second fastening hole 32 in a diagonal direction and may be distanced from the third fastening hole 33 in a diagonal direction thereof.

As illustrated in FIG. 3 and FIG. 4, the leg bracket 17 may have a fourth fastening hole 41 formed therein to correspond to the first fastening hole 31, and the transmission mount 9 may have a fifth fastening hole 42 formed on a front side thereof to correspond to the second fastening hole 32, and a sixth fastening hole 43 formed on a rear side thereof to correspond to the third fastening hole 33. The fourth fastening hole 41 may be distanced from the fifth fastening hole 42 in a diagonal direction and may be distanced from the sixth fastening hole 43 in a diagonal direction thereof.

The battery tray 20 may be securely secured to the leg bracket 17 and the transmission mount 9 by fastening a fastener to the first fastening hole 31 of the battery tray 20 and the fourth fastening hole 41 of the leg bracket 17, fastening a fastener to the second fastening hole 32 of the battery tray 20 and the fifth fastening hole 42 of the transmission mount 9, and fastening a fastener to the third fastening hole 33 of the battery tray 20 and the sixth fastening hole 43 of the transmission mount 9.

Since the battery tray 20 is secured to the leg bracket 17 and the transmission mount 9 in a three-point fixing manner as described above, the center of gravity G of the battery tray 20 may be adjacent to the front side member 7, and thus the battery 10 and the battery tray 20 may be more securely coupled to the front side member 7.

Figure 16:
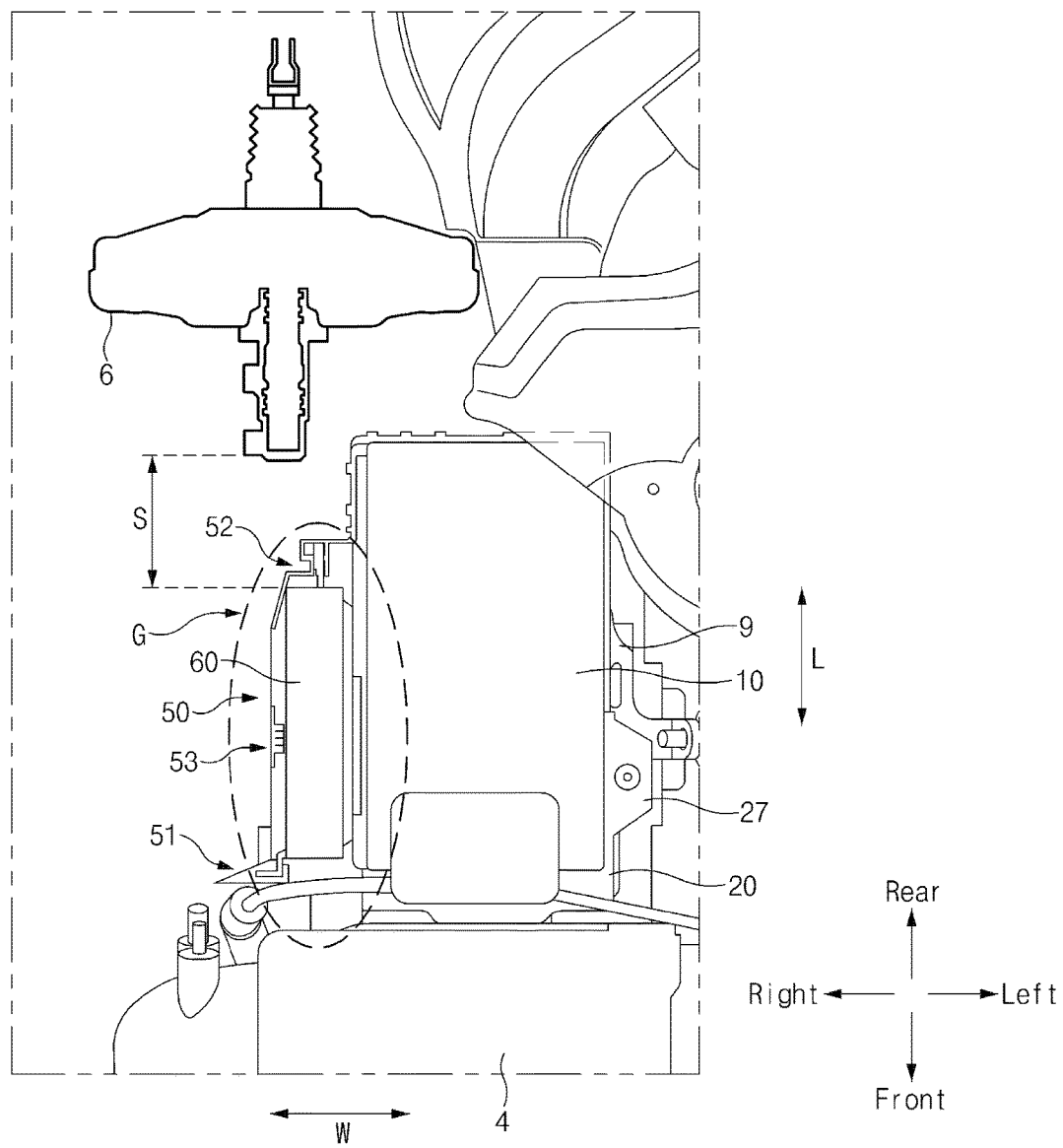
FIG. 16 is a plan view illustrating a state in which the battery mounting structure, according to an exemplary embodiment of the present invention, is disposed in the engine compartment.

Since the first fastening hole 31 and the second fastening hole 32, which are adjacent to the front edge portion 21 of the battery tray 20, are secured to the fourth fastening hole 41 of the leg bracket 17 and the fifth fastening hole 42 of the transmission mount 9, respectively, as described above, the battery 10 and the battery tray 20 may pivot upward about the front edge portion 21 of the battery tray 20 in the case of a collision of the vehicle 1. Accordingly, the battery 10 may first collide with a cowl of the vehicle body without directly hitting a booster 6 (see FIG. 16) so that the amount of collision energy transferred to the booster 6 may be reduced. As a result, it is possible to minimize a movement of pedals toward the internal of the vehicle 1, reducing an injury to a lower limb of a driver or passenger.

Furthermore, a battery tray in the related art is secured to two leg brackets, whereas the battery tray 20 according to an exemplary embodiment of the present invention is secured to one leg bracket 17 and the transmission mount 9 so that it is possible to reduce the weight and material cost.

Figure 9:
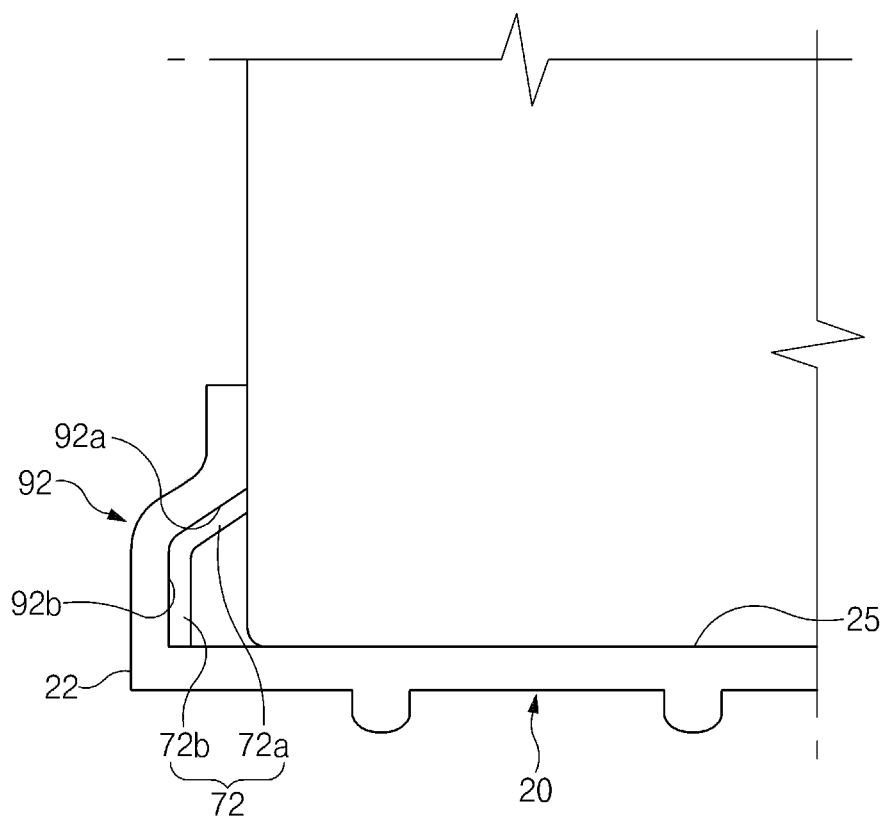
FIG. 9 is a sectional view taken along line B-B of FIG. 7.
Figure 10:
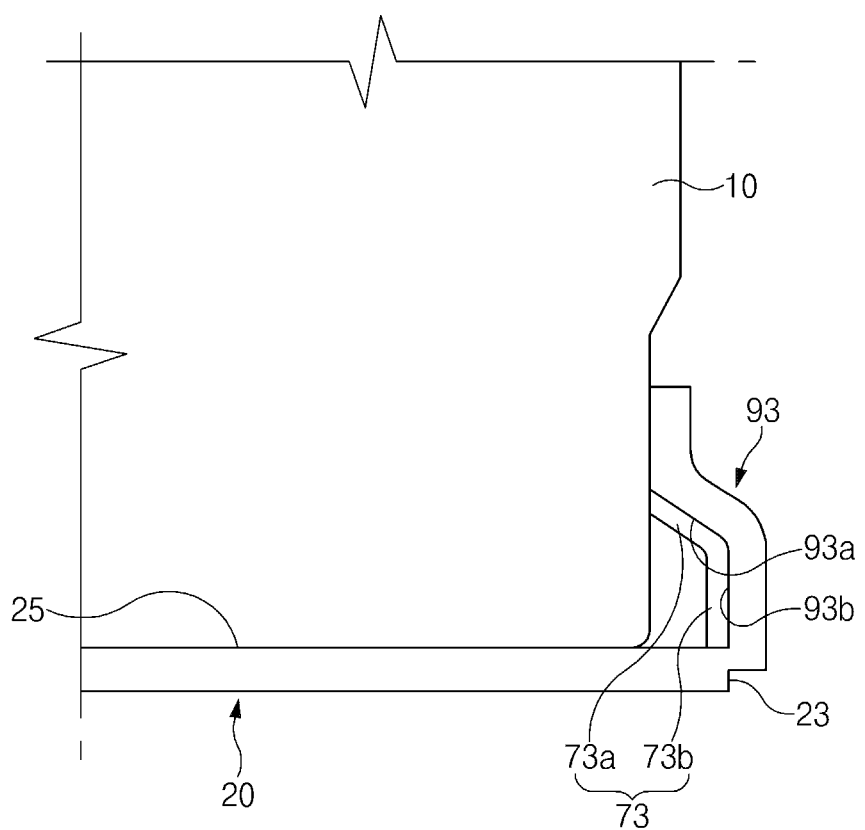
FIG. 10 is a sectional view taken along line C-C of FIG. 7.

Referring to FIG. 9 and FIG. 10, the battery 10 may have a plurality of legs 71, 72, 73, and 74 separately formed on the respective faces 11, 12, 13, and 14 thereof.

The legs 71, 72, 73, and 74 may have a structure bent from the respective edge portions of the battery 10. The legs 71, 72, 73, and 74 of the battery 10 may be coupled to the respective edge portions of the battery tray 20.

The legs 71, 72, 73, and 74 may generate an elastic force due to the bent structure thereof, and thus the legs 71, 72, 73, and 74 of the battery 10 may be elastically coupled to the respective edge portions of the battery tray 20.

The plurality of legs 71, 72, 73, and 74 may include the first leg 71 formed on a lower side of the front face 11 of the battery 10, the second leg 72 formed on a lower side of the rear face 12 of the battery 10, the third leg 73 formed on a lower side of the left face 13 of the battery 10, and the fourth leg 74 formed on a lower side of the right face 14 of the battery 10.

The battery tray 20 may have a plurality of restriction ribs 92, 93, and 94 that restrict at least some legs of the battery 10.

Among the plurality of legs 71, 72, 73, and 74, at least one leg may be secured to the battery tray 20 by a fixing bracket 81, and the remaining legs may be restricted from moving in the longitudinal direction (front and rear direction), the lateral direction (left and right direction), the vertical direction, or the like of the vehicle 1 by the restriction ribs 92, 93, and 94 of the battery tray 20. Accordingly, the battery 10 may be prevented from moving in the longitudinal direction (front and rear direction), the lateral direction (left and right direction), the vertical direction, or the like of the vehicle 1.

Figure 8:
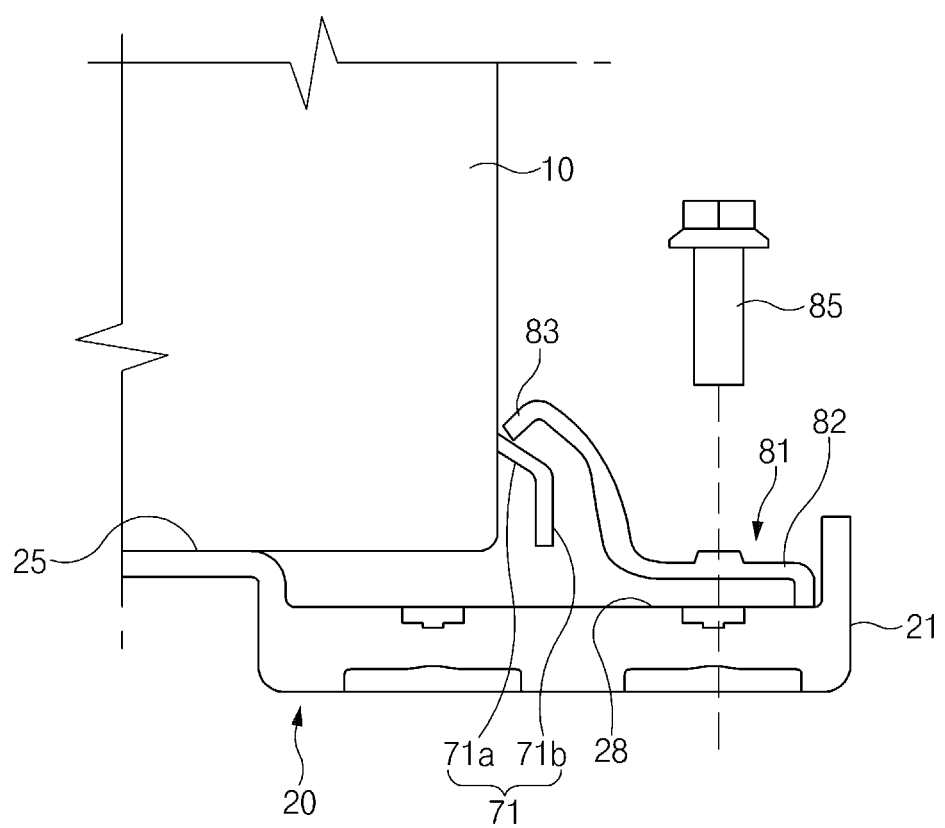
FIG. 8 is a sectional view taken along line A-A of FIG. 7.

Referring to FIG. 8, the first leg 71 may have a sloping portion 71a obliquely extending from a lower portion of the front face 11 of the battery 10 and a vertical portion 71b vertically extending from the sloping portion 71a. The first leg 71 of the battery 10 may be coupled to the front edge portion 21 of the battery tray 20 by the fixing bracket 81.

The fixing bracket 81 may include a stationary portion 82 secured to the front edge portion 21 of the battery tray 20 by a fastener 85, and a pressing portion 83 that presses the first leg 71. The stationary portion 82 may have a fastening hole 84 and may be secured to the front edge portion 21 of the battery tray 20 by fastening the fastener 85 to the fastening hole 84 of the stationary portion 82. The pressing portion 83 may be bent from the stationary portion 82, and a free end portion of the pressing portion 83 may press the sloping portion 71a of the first leg 71. When the stationary portion 82 is secured to the battery tray 20 by the fastener 85, the pressing portion 83 may press the sloping portion 71a of the first leg 71, and thus the first leg 71 of the battery 10 may be securely secured to the battery tray 20.

A seat 28 on which the fixing bracket 28 is seated may be formed at the front edge portion 21 of the battery tray 20.

According to various aspects of the present invention, as illustrated in FIG. 8, the seat 28 may be located at a lower position than the support face 25 of the battery tray 20, and thus the fixing bracket 81 may more securely secure the first leg 71 of the battery 10.

Figure 15:
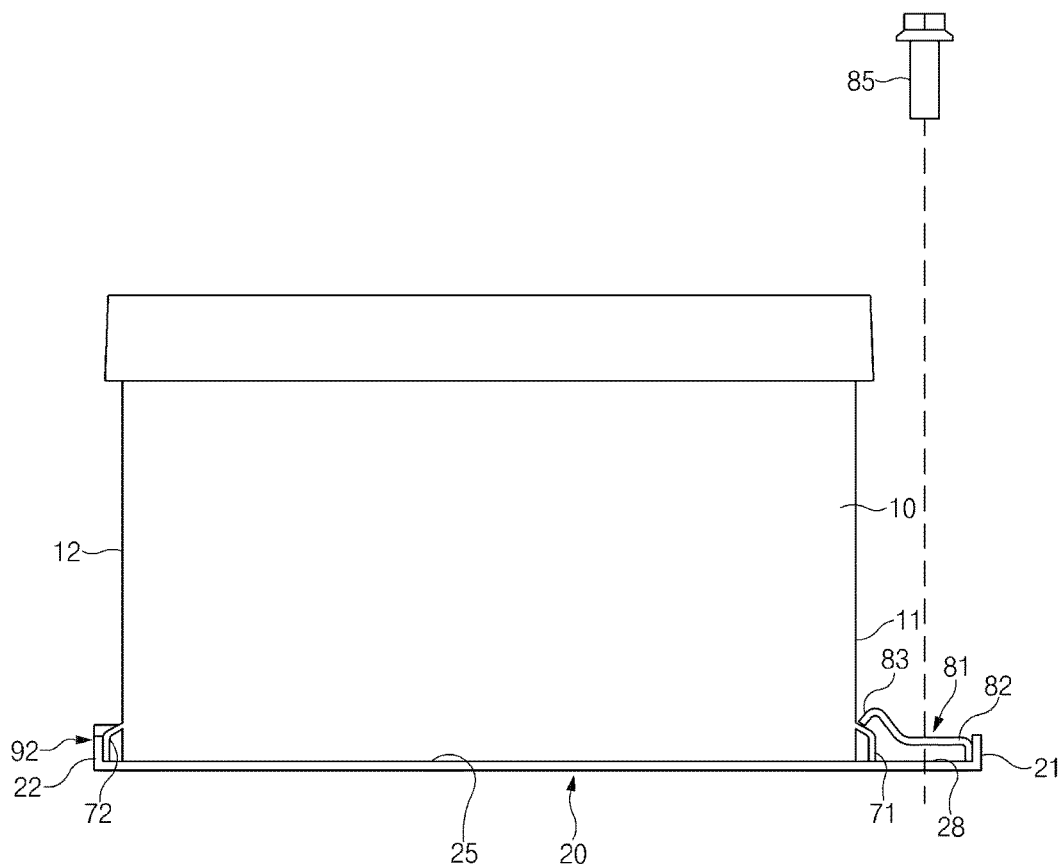
FIG. 15 is a sectional view taken along line F-F of FIG. 14.

According to another exemplary embodiment, as illustrated in FIG. 15, the seat 28 may be located at the same height as the support face 25 of the battery tray 20.

The battery tray 20 may have the plurality of restriction ribs 92, 93, and 94 that restrict the second, third, and fourth legs 72, 73, and 74 of the battery 10, and at least one of the plurality of restriction ribs 92, 93, and 94 may be configured to not restrict a leg corresponding thereto in the vertical direction, which may facilitate assembly of the battery 10.

Referring to FIG. 9, the second leg 72 may have a sloping portion 72a obliquely extending from a lower portion of the rear face 12 of the battery 10 and a vertical portion 72b vertically extending from the sloping portion 72a. The rear restriction rib 92 may be formed at the rear edge portion 22 of the battery tray 20. The rear restriction rib 92 may have an inclined face 92a corresponding to the sloping portion 72a of the second leg 72 and a vertical face 92b corresponding to the vertical portion 72b of the second leg 72. The sloping portion 72a and the vertical portion 72b of the second leg 72 may be coupled to the inclined face 92a and the vertical face 92b of the rear restriction rib 92, and thus the second leg 72 may be restricted from moving in the vertical direction and the longitudinal direction (front and rear direction) of the vehicle 1 by the rear restriction rib 92. As a result, the lower portion of the rear face 12 of the battery 10 may be supported at the rear edge portion 22 of the battery tray 20.

Referring to FIG. 10, the third leg 73 may have a sloping portion 73a obliquely extending from the left face 13 of the battery 10 and a vertical portion 71b vertically extending from the sloping portion 73a. The left restriction rib 93 may be formed at the left edge portion 23 of the battery tray 20. The left restriction rib 93 may have an inclined face 93a corresponding to the sloping portion 73a of the third leg 73 and a vertical face 93b corresponding to the vertical portion 73b of the third leg 73. The sloping portion 73a and the vertical portion 73b of the third leg 73 may be coupled to the inclined face 93a and the vertical face 93b of the left restriction rib 93, and thus the third leg 73 may be restricted from moving in the vertical direction and the lateral direction (left and right direction) of the vehicle 1 by the left restriction rib 93. As a result, a lower portion of the left face 13 of the battery 10 may be supported at the left edge portion 23 of the battery tray 20.

Figure 11:
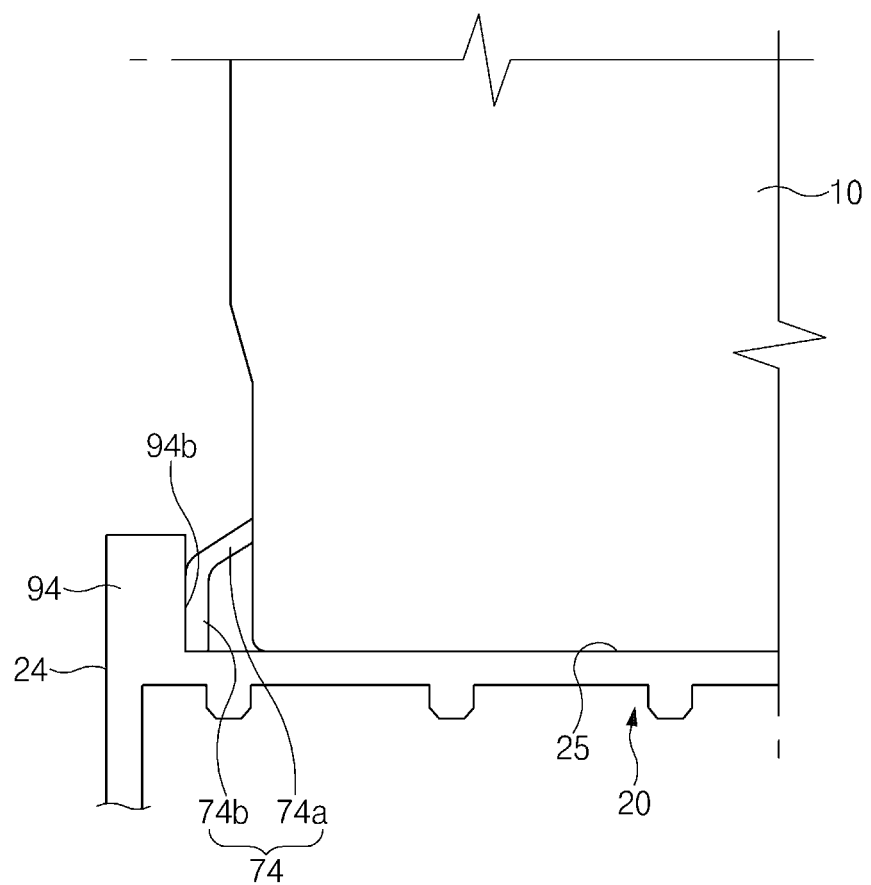
FIG. 11 is a sectional view taken along line D-D of FIG. 7.

Referring to FIG. 11, the fourth leg 74 may have a sloping portion 74a obliquely extending from a lower portion of the right face 14 of the battery 10 and a vertical portion 71b vertically extending from the sloping portion 74a. The right restriction rib 94 may be formed at the right edge portion 24 of the battery tray 20 and may have a vertical face 94b corresponding to the vertical portion 74b of the fourth leg 74. The vertical portion 74b of the fourth leg 74 may be supported on the vertical face 94b of the right restriction rib 94, and thus the fourth leg 74 may be restricted from moving in the lateral direction (left and right direction) of the vehicle 1 by the right restriction rib 94. As a result, the lower portion of the right face 14 of the battery 10 may be supported at the right edge portion 24 of the battery tray 20. Since the right restriction rib 94 have no inclined face restricting the sloping portion 74a of the fourth leg 94, the right restriction rib 94 may not restrict the fourth leg 94 in the vertical direction, which may facilitate assembly of the battery 10.

As described above, according to an exemplary embodiment of the present invention, the first leg 71 of the battery 10 may be secured by the fixing bracket 81, the second leg 72 of the battery 10 may be restricted by the rear restriction rib 92 in the vertical direction and the longitudinal direction of the vehicle 1, and the third leg 73 and the fourth leg 74 of the battery 10 may be restricted by the left restriction rib 93 and the right restriction rib 94 in the lateral direction of the vehicle 1. As a result, the battery 10 may be securely secured to the battery tray 20. Therefore, the battery 10 may move together with the battery tray 20 without separation from the battery tray 20 even under severe test conditions including oblique impact, rear impact, and the like and may thus meet the requirements of battery separation prevention regulations.

In addition, according to an exemplary embodiment of the present invention, the second to fourth legs 72, 73, and 74 of the battery 10 may be restricted by the restriction ribs 92, 93, and 94 of the battery tray 20 so that it is not necessary to implement a structure in which the fixing bracket 81 surrounds the battery 10. As a result, the size of the fixing bracket 81 may be remarkably decreased, and the structure of the fixing bracket 81 may be simplified. The decrease in the size of the fixing bracket 81 and the simple structure thereof may contribute to a reduction in the weight or manufacturing cost of the bracket 81.

Figure 12:
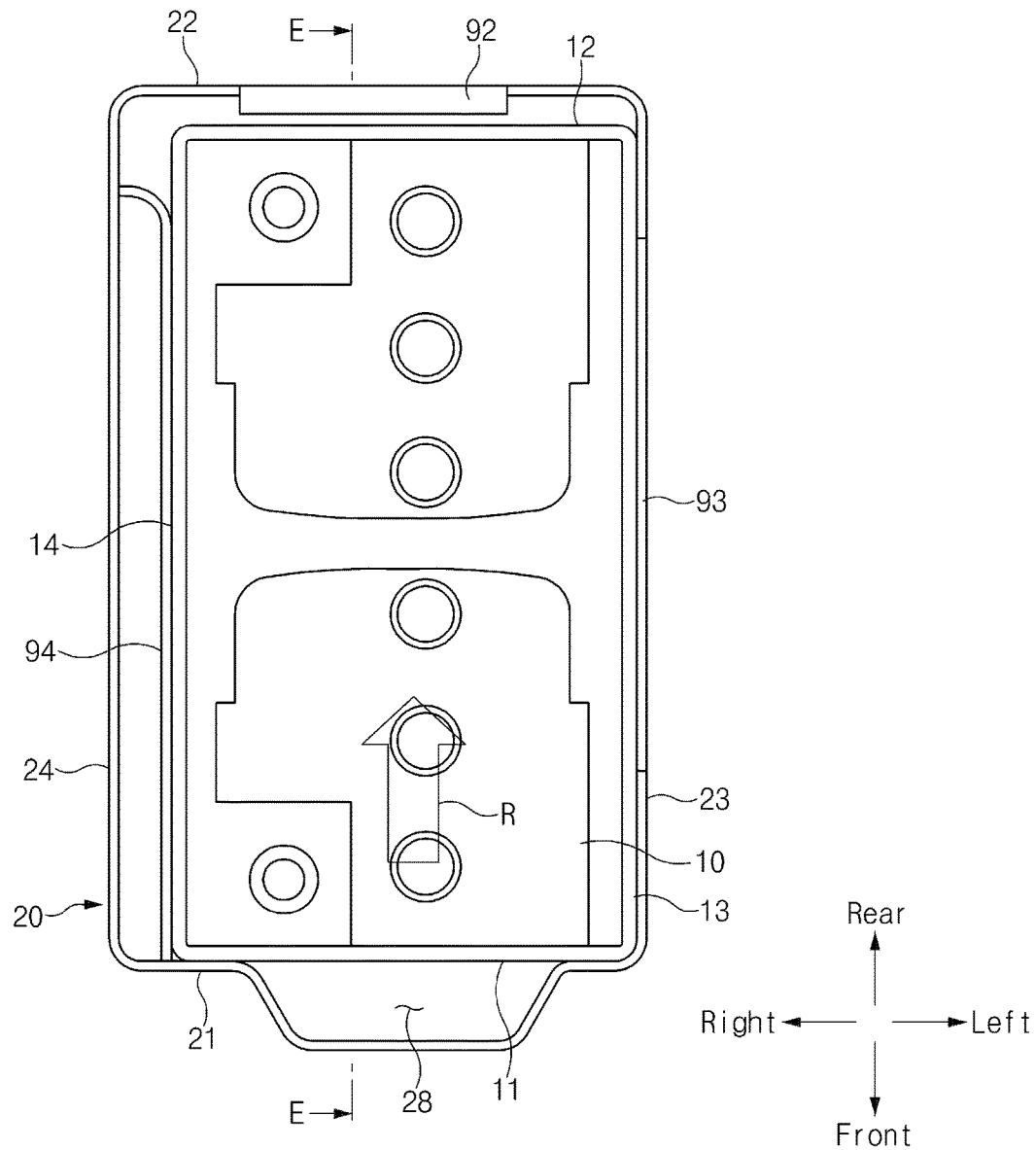
FIG. 12 is a plan view illustrating a state before the battery is secured to the battery tray in the battery mounting structure, according to an exemplary embodiment of the present invention.
Figure 13:
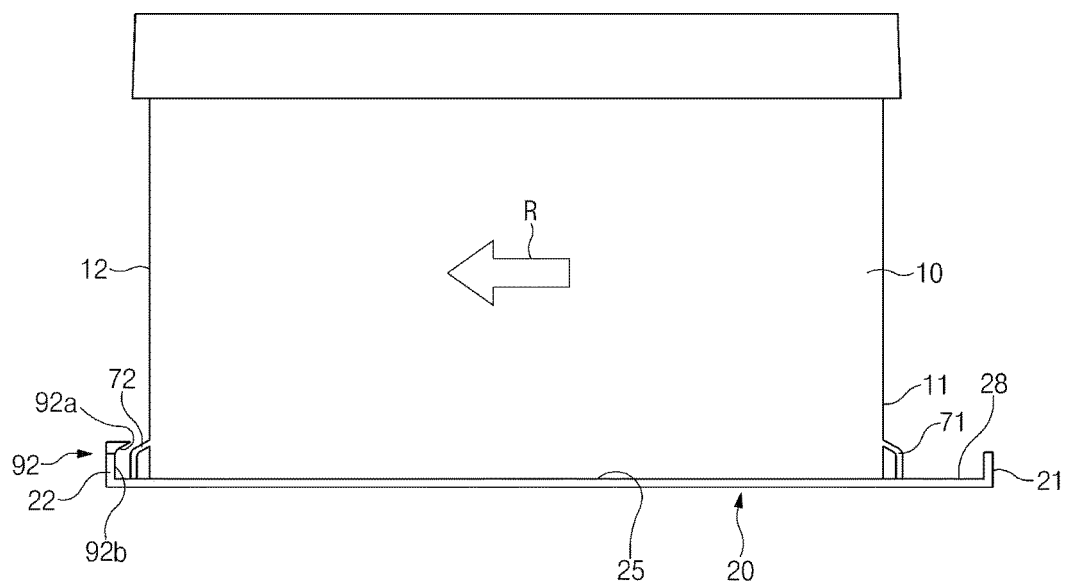
FIG. 13 is a sectional view taken along line E-E of FIG. 12.
Figure 14:
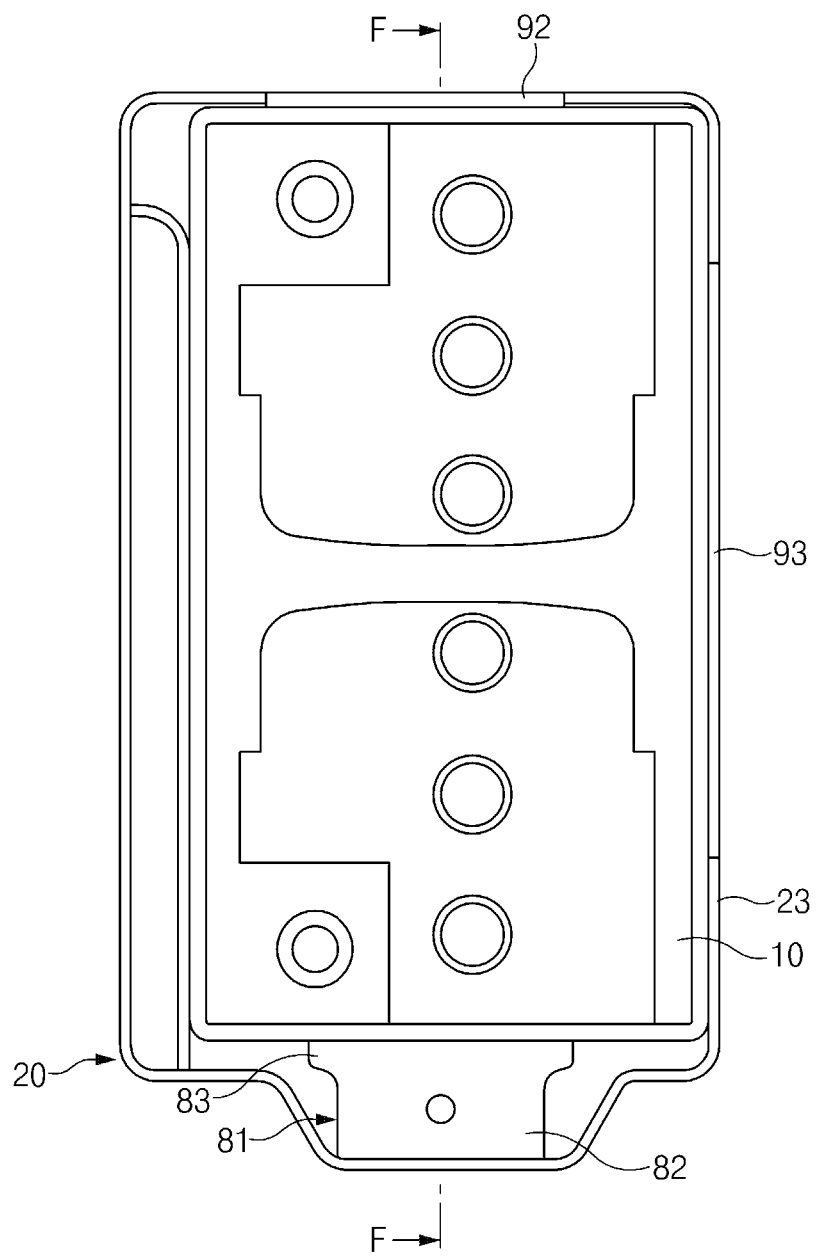
FIG. 14 is a plan view illustrating a state in which the battery is secured to the battery tray in the battery mounting structure, according to an exemplary embodiment of the present invention.

FIGS. 12 to 15 illustrate a process in which the battery 10 is coupled to the battery tray 20. When the battery 10 is pushed rearward (see the direction of an arrow R in FIG. 12, and FIG. 13) on the support face 25 of the battery tray 20 as illustrated in FIG. 12, and FIG. 13, the second leg 72 of the battery 10 may be coupled to the rear restriction rib 92 of the battery tray 20 as illustrated in FIG. 15. As such, the fixing bracket 81 may be coupled to the seat 28 of the battery tray 20 by the fastener 85, and the first leg 71 of the battery 10 may be secured to the front edge portion 21 of the battery tray 20.

As described above, according to an exemplary embodiment of the present invention, the battery 10 may be displaced on the support face 25 of the battery tray 20 in the longitudinal direction of the vehicle 1 and may then be secured by the fixing bracket 81. Therefore, the assembly of the battery 10 may be performed in an easy and simple manner.

According to an exemplary embodiment of the present invention, the battery tray 20 may further include a mounting shelf 50 on which an engine controller 60 is mounted.

The mounting shelf 50 may be integrally formed on a side of the battery tray 20. According to an exemplary embodiment of the present invention, the mounting shelf 50 may be integrally formed at the right edge portion 24 of the battery tray 20. Since the engine controller 60, together with the battery 10, may be mounted on the battery tray 20 as described above, high-speed crashworthiness may be remarkably improved.

Figure 18:
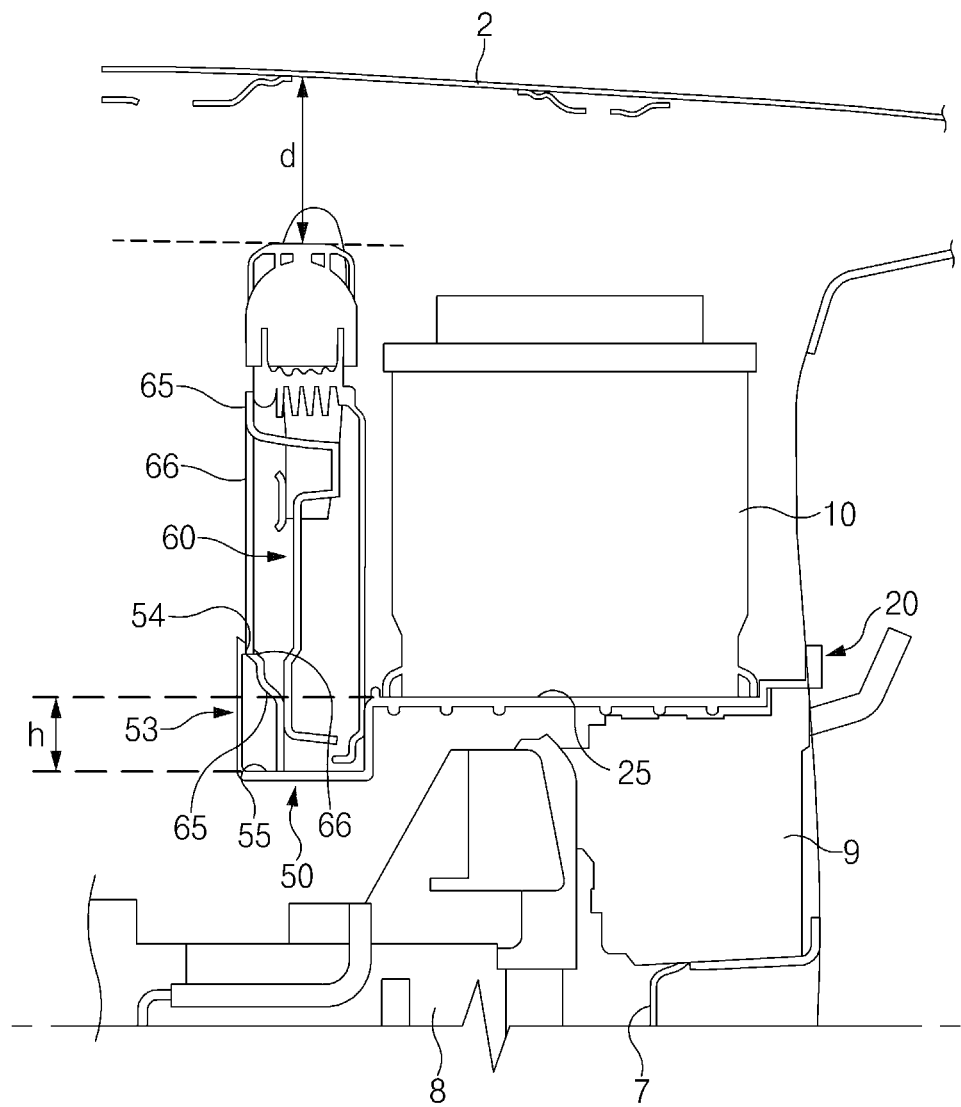
FIG. 18 is an elevation view illustrating a state in which the battery mounting structure, according to an exemplary embodiment of the present invention, is disposed in the engine compartment.

The mounting shelf 50 may have a base 55 that supports the bottom face of the engine controller 60. As illustrated in FIG. 18, the base 55 of the mounting shelf 50 may be located at a lower position than the support face 25 of the tray 20. Accordingly, a height difference h may be formed between the support face 25 of the battery tray 20 and the base 55 of the mounting shelf 50, and the mounting position of the engine controller 60 may be located on a lower side of the engine compartment 5.

Since the engine controller 60 is disposed on a lower side of the engine compartment 5 as described above, a gap d between the engine controller 60 and a hood 2 that opens or closes the top portion of the engine compartment 5 may be stably ensured, satisfying a protection space for a pedestrian.

The engine controller 60 may have a cover plate 65 coupled to one face thereof through a fastener. The engine controller 60 may be mounted on the mounting shelf 50 by coupling the cover plate 65 of the engine controller 60 to the mounting shelf 50.

Figure 17:
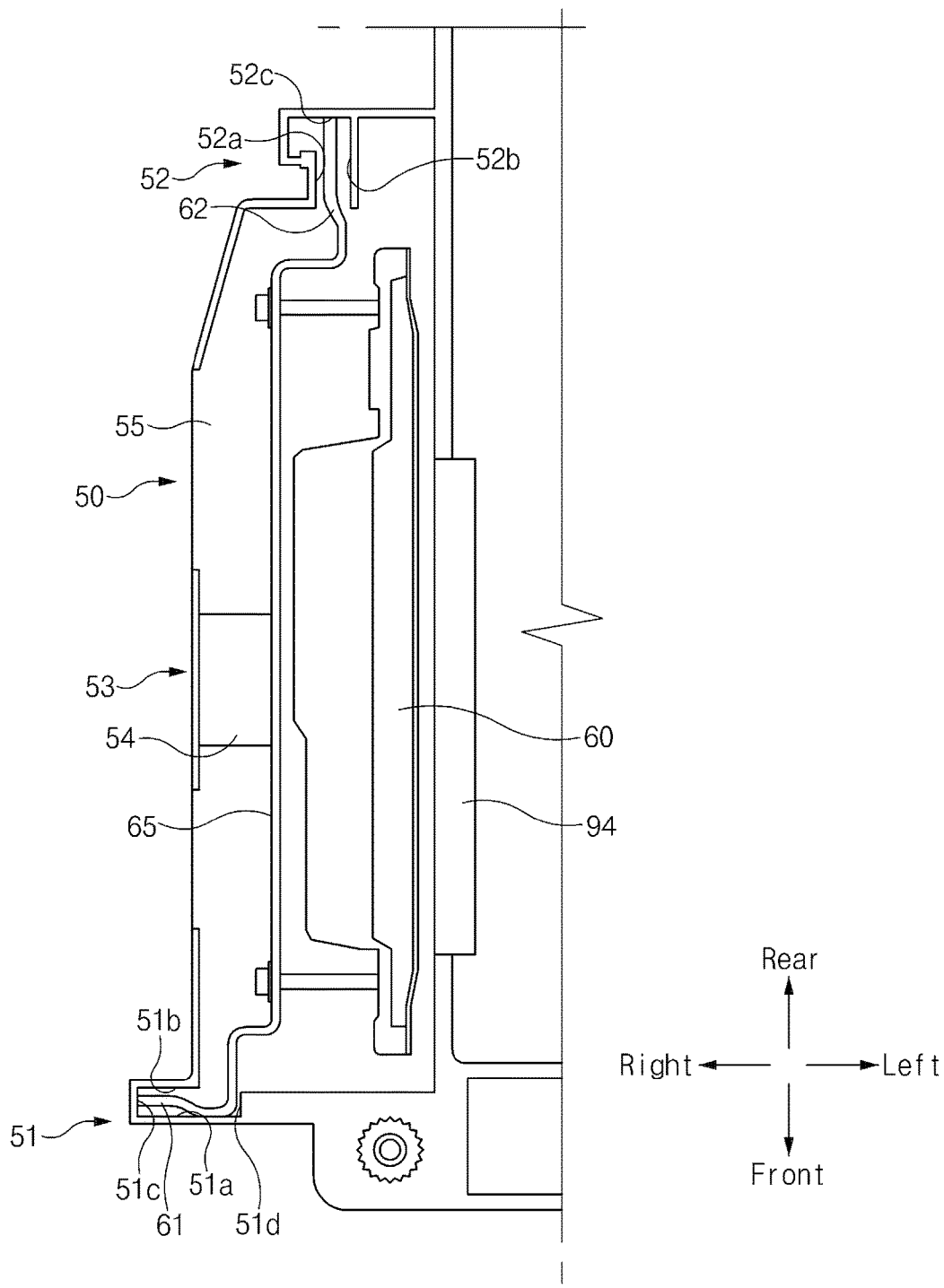
FIG. 17 is a blowup of detail G in FIG. 16.

As illustrated in FIG. 17, the cover plate 65 may have a front extension 61 extending from a front edge portion thereof, a rear extension 62 extending from a rear edge portion thereof, and an opening 66 (see FIGS. 2 and 18) formed in the center portion thereof.

The front extension 61 may extend in a direction perpendicular to the longitudinal edge portions 23 and 24 of the battery tray 20. The rear extension 62 may extend in a direction parallel to the longitudinal edge portions 23 and 24 of the battery tray 20. As a result, the front extension 61 and the rear extension 62 may extend in the directions perpendicular to each other.

The mounting shelf 50 may have a plurality of posts 51, 52, and 53 that support the cover plate 65 of the engine controller 60.

The plurality of posts 51, 52, and 53 may include a front post 51 supporting the front extension 61 of the cover plate 65, a rear post 52 supporting the rear extension 62 of the cover plate 65, and an intermediate post 53 supporting the opening 66 of the cover plate 65.

The front post 51 may have an opening to which the front extension 61 of the cover plate 65 is coupled, and the opening of the front post 51 may be defined by a plurality of support faces 51a, 51b, 51c, and 51d. The plurality of support faces 51a, 51b, 51c, and 51d may include the first support face 51a supporting the front face of the front extension 61, the second support face 51b supporting the rear face of the front extension 61, the third support face 51c supporting the right face of the front extension 61, and the fourth support face 51d supporting the left face of the front extension 61. Since the front extension 61 of the cover plate 65 is perpendicular to the longitudinal edge portions 23 and 24 of the battery tray 20 as described above, the first to fourth support faces 51a, 51b, 51c, and 51d of the front post 51 may support the front extension 61 of the cover plate 65 in the four directions.

The rear post 52 may have an opening to which the rear extension 62 of the cover plate 65 is coupled, and the opening of the rear post 52 may be defined by a plurality of support faces 52a, 52b, and 52c. The plurality of support faces 52a, 52b, and 52c may include the first support face 52a supporting the right face of the rear extension 62, the second support face 52b supporting the left face of the rear extension 62, and the third support face 52c supporting the rear face of the rear extension 62. In the present way, the first to third support faces 52a, 52b, and 52c of the rear post 52 may support the rear extension 62 of the cover plate 65 in the three directions.

Since the front extension 61 of the cover plate 65 is supported by the front post 51 in the four directions and the rear extension 62 of the cover plate 65 is supported by the rear post 52 in the three directions as described above, the engine controller 60 may be securely coupled to the mounting shelf 50, and high-speed crashworthiness may be remarkably improved.

As illustrated in FIG. 18, the intermediate post 53 may have a hook 54 formed on an upper end portion thereof, and the hook 54 may be coupled to the edge portion of the opening 66 of the cover plate 65 by a snap-fit connection.

Since the engine controller 60 is fitted into the mounting shelf 50 by the front post 51, the rear post 52, and the intermediate post 53 of the mounting shelf 50 as described above, a separate fastener is not needed, and thus it is possible to decrease the number of assembly steps, as well as to remarkably reduce the weight and material cost. This may help to increase economic effects, in addition to improving the crashworthiness of the vehicle.

As described above, according to an exemplary embodiment of the present invention, the battery tray 20 may be secured to the left front side member 7. As a result, it is possible to reduce the weight on the left side of the engine compartment 5, balancing the weight of the vehicle and thus solving a problem of leaning to a side during braking and remarkably improving driving stability.

Although the present invention has been described with reference to exemplary embodiments and the accompanying drawings, the present invention is not limited thereto, but may be variously modified and altered by those skilled in the art to which the present invention pertains without departing from the spirit and scope of the present invention.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An automotive battery mounting structure comprising:
  a battery tray connected to one of a pair of front side members disposed on a lower side of an engine compartment; and
  a battery secured to the battery tray,
  wherein a transmission mount and a leg bracket are coupled to the front side member, and
  wherein the battery tray is coupled to the transmission mount and the leg bracket by a plurality of fasteners,
  wherein the battery tray has a first fastening hole formed in a portion adjacent to a first edge portion of the battery tray, a second fastening hole formed in a portion adjacent to a second edge portion and the first edge portion of the battery tray, and a third fastening hole adjacent to a third edge portion of the battery tray, wherein the first fastening hole is secured to the leg bracket by a fastener, and wherein the second and third fastening holes are secured to the transmission mount.

2. The automotive battery mounting structure of claim 1, wherein at least a portion adjacent to a front edge portion of the battery tray is coupled to the transmission mount and the leg bracket.

3. The automotive battery mounting structure of claim 1, wherein the leg bracket extends in a direction perpendicular to an axial direction of the front side member.

4. The automotive battery mounting structure of claim 1, wherein a longitudinal face of the battery and a longitudinal edge portion of the battery tray are disposed along a longitudinal direction of a vehicle.

5. The automotive battery mounting structure of claim 1, wherein the battery has a plurality of legs, and wherein at least one of the plurality of legs is secured to the battery tray by a fixing bracket.

6. The automotive battery mounting structure of claim 5, wherein the battery tray has a plurality of restriction ribs that restrict at least one of the plurality of legs.

7. The automotive battery mounting structure of claim 6, wherein each leg has a sloping portion obliquely extending from a lower portion of the battery and a vertical portion vertically extending from the sloping portion.

8. The automotive battery mounting structure of claim 7, wherein at least one of the plurality of restriction ribs has an inclined face corresponding to the sloping portion of the leg and a vertical face corresponding to the vertical portion of the leg.

9. The automotive battery mounting structure of claim 7, wherein at least one of the plurality of restriction ribs has a vertical face corresponding to the vertical portion of the leg.

10. The automotive battery mounting structure of claim 1, wherein the battery tray further includes a mounting shelf on which an engine controller is mounted, and wherein the mounting shelf has a base that supports a bottom face of the engine controller.

11. The automotive battery mounting structure of claim 10, wherein the base of the mounting shelf is located lower than a support face of the battery tray.

12. The automotive battery mounting structure of claim 10, wherein the mounting shelf is integrally formed at a right edge portion of the battery tray.

13. The automotive battery mounting structure of claim 10, wherein the engine controller has a cover plate coupled to one face of the engine controller, wherein the cover plate has a front extension extending from a front edge portion of the cover plate, a rear extension extending from a rear edge portion of the cover plate, and an opening formed in a center portion of the cover plate, and wherein the mounting shelf has a plurality of posts supporting the cover plate of the engine controller.

14. The automotive battery mounting structure of claim 13, wherein the front extension extends in a direction perpendicular to a longitudinal edge portion of the battery tray, and wherein the rear extension extends in a direction parallel to the longitudinal edge portion of the battery tray.

15. The automotive battery mounting structure of claim 13, wherein the plurality of posts include a front post supporting the front extension of the cover plate, a rear post supporting the rear extension of the cover plate, and an intermediate post supporting the opening of the cover plate.

16. The automotive battery mounting structure of claim 15, wherein the front post has an opening to which the front extension of the cover plate is coupled, wherein the opening of the front post is defined by a plurality of support faces, and wherein the plurality of support faces include a first support face supporting a front face of the front extension, a second support face supporting a rear face of the front extension, a third support face supporting a right face of the front extension, and a fourth support face supporting a left face of the front extension.

17. The automotive battery mounting structure of claim 15, wherein the rear post has an opening to which the rear extension of the cover plate is coupled, wherein the opening of the rear post is defined by a plurality of support faces, and wherein the plurality of support faces include a first support face supporting a right face of the rear extension, a second support face supporting a left face of the rear extension, and a third support face supporting a rear face of the rear extension.

* * * * *